A. T. SHIPMAN.
HAND COTTON PICKING APPARATUS.
APPLICATION FILED OCT. 11, 1920.
1,402,670.
Patented Jan. 3, 1922.
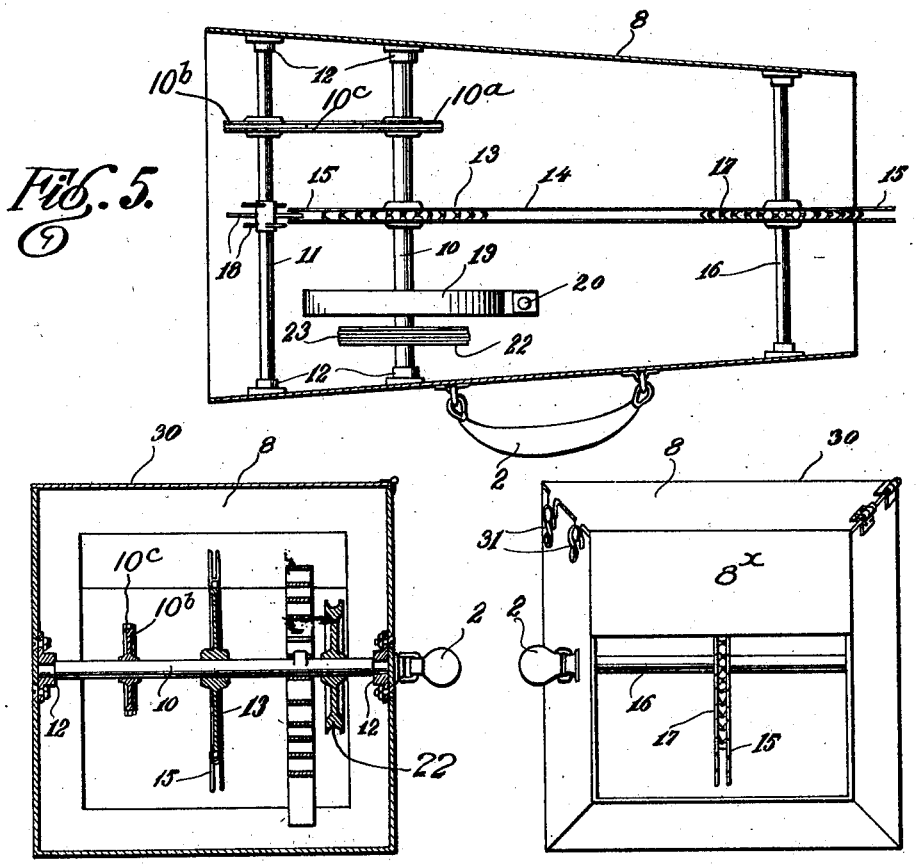
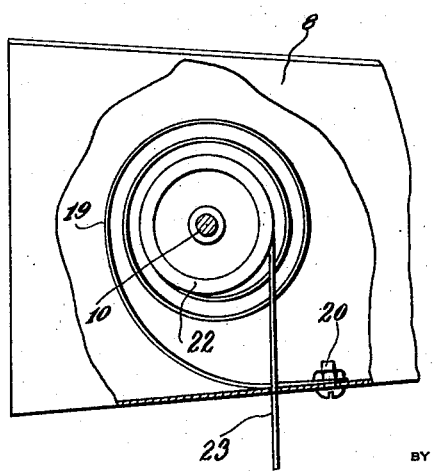
A. T. SHIPMAN
INVENTOR

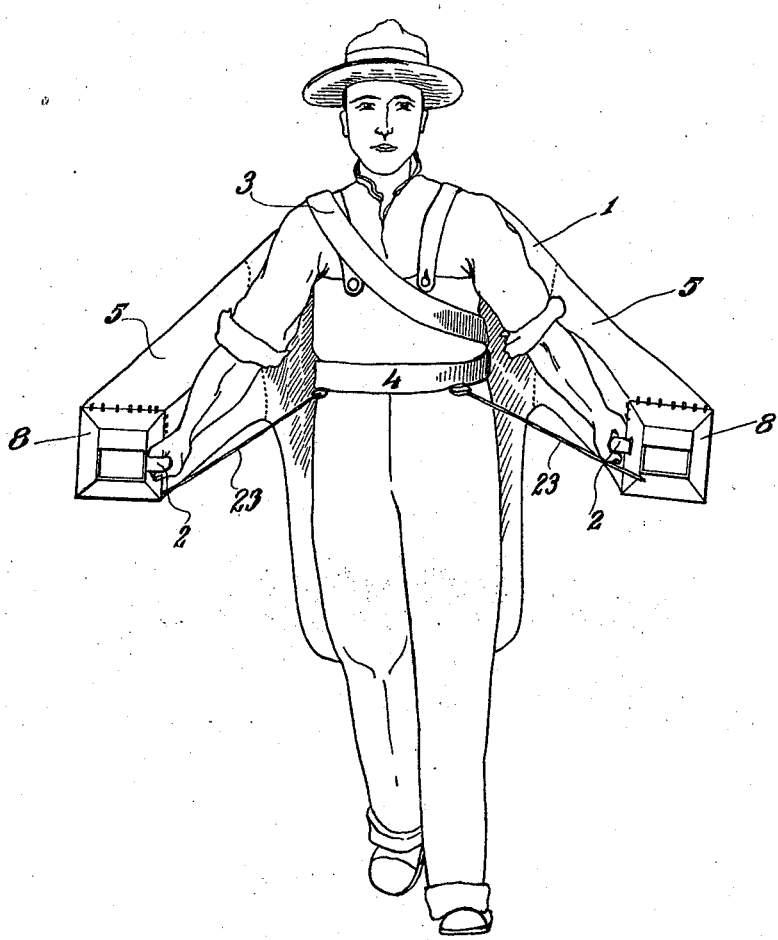

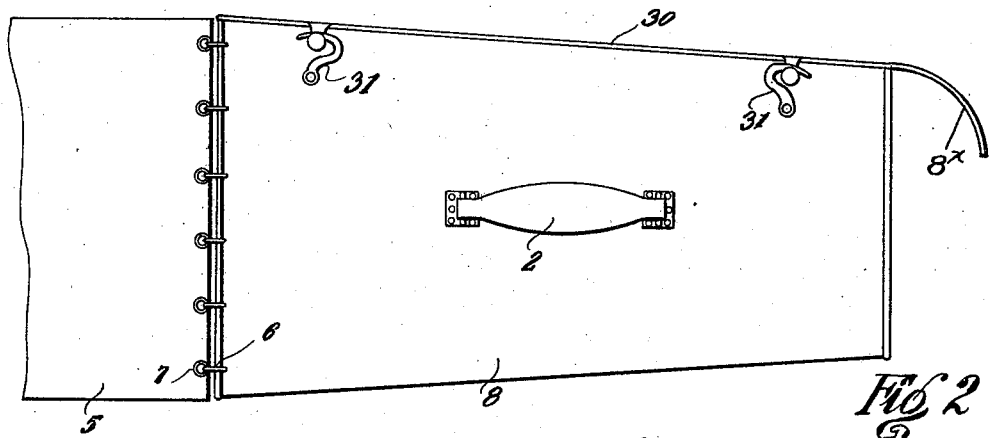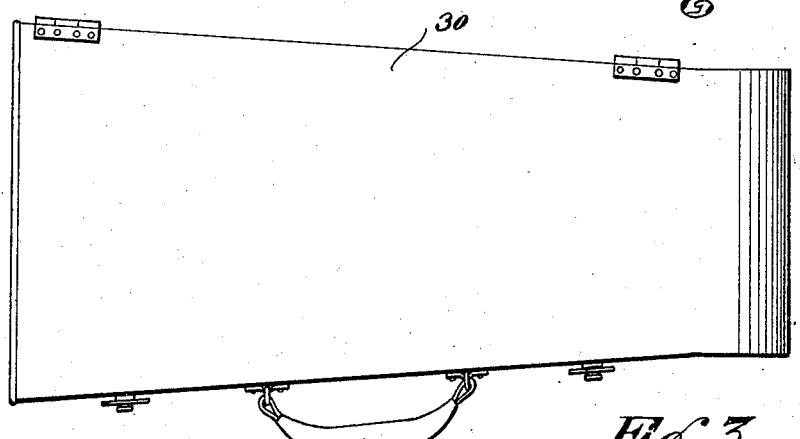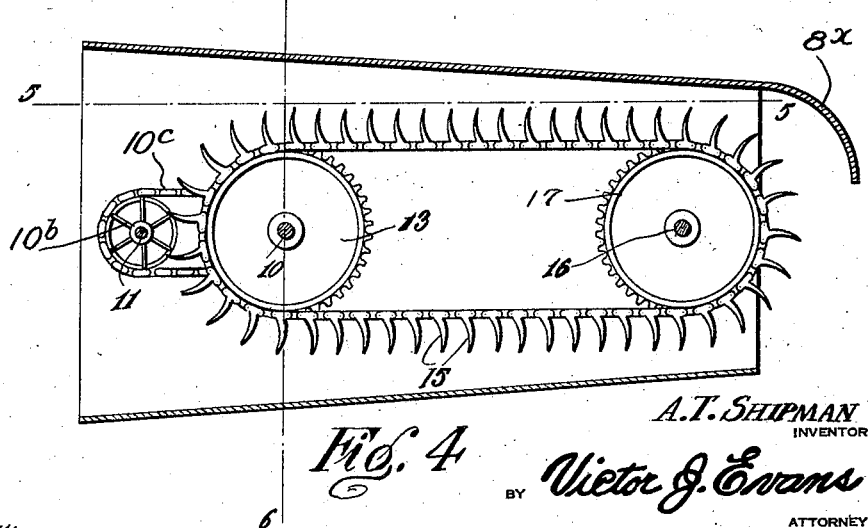

UNITED STATES PATENT OFFICE.

ABRAHAM T. SHIPMAN, OF HONEY GROVE, TEXAS.

HAND COTTON-PICKING APPARATUS.

1,402,670.  Specification of Letters Patent.  Patented Jan. 3, 1922.

Application filed October 11, 1920. Serial No. 416,035.

*To all whom it may concern:*

Be it known that I, ABRAHAM T. SHIPMAN, a citizen of the United States, residing at Honey Grove, in the county of Fannin and State of Texas, have invented new and useful Improvements in Hand Cotton-Picking Apparatus, of which the following is a specification.

My present invention has for its object the provision of a simple, durable, light and efficient cotton-picking apparatus adapted to be conveniently carried and operated to advantage by a farm hand.

To the attainment of the foregoing the invention consists in the improvement as hereinafter described and definitely claimed.

In the accompanying drawings, hereby made a part hereof:—

Figure 1 is a view illustrative of the manner in which my novel apparatus is carried by a workman.

Figure 2 is a side elevation of the apparatus with parts broken away.

Figure 3 is a top plan view of the apparatus.

Figure 4 is a longitudinal section of the apparatus.

Figure 5 is a section taken in the plane indicated by the line 5—5 of Figure 4.

Figure 6 is a section taken in the plane indicated by the line 6—6 of Figure 4.

Figures 7 and 8 are views of details hereinafter explicitly referred to.

Similar numerals of reference designate corresponding parts in all of the views of the drawings.

Among other elements my apparatus includes a sack 1 to receive the picked cotton. The sack is provided with a strap 3, designed to extend over the shoulder and breast of the workman after the manner illustrated in Figure 1. On the sack is a belt or strap 4 which is extended around the waist of the workman.

At 5 are attachments of the general configuration illustrated. The sack 1 is open at each side sufficiently to receive the wide ends of the attachments 5, and the wide ends of the attachments are connectetd by hooks 6 and eyelets 7 to the open portions of the sack and extend in the form of open tubes to the small ends through which the pickers operate.

As illustrated each picker of my apparatus includes a rectangular casing 8 that is comparatively large at the end attached to the sack and is diminished toward its opposite end. At the small end of the picker is a projecting overhanging portion $8^x$ which has for its function to prevent the picker hooks, hereinafter described from catching into the leaves of cotton plants. Extending across the large end of each picker casing 8 are shafts 10 and 11 the ends of which are disposed in anti-friction bearings 12 carried by the walls of the casing 8. Carried by the said shaft 10 is a sprocket wheel 13 on which is mounted a picker chain 14 equipped with hooks 15, said hooks having for their function to engage and remove cotton from the bolls. A third shaft 16 is also employed in combination with the picker chain 14; said shaft 16 being disposed in the comparatively small end portion of the picker casing and being mounted in anti-friction bearings and equipped with a sprocket wheel 17. In this connection it is to be understood that a wheel on the shaft 11 at the large end of the casing is equipped with spikes 18 that serve to knock the cotton from the hooks 15 into the sack. The shaft 11 is rotated from the shaft 10 through the wheels $10^a$ and $10^b$ and the belt $10^c$.

For the purpose of actuating the picker I employ a spiral spring 19 one end of which is connected at 20 to the wall of the casing 8. The opposite end of said spring is strongly connected to the shaft of the belt-carrying sprocket wheel, and in this connection it will be understood that a pulley 22 on the same shaft carries a cord 23 one end of which is fastened to the pulley and the other end to the before mentioned belt 4. From this it follows that when the picker is extended the spring 19 is placed under tension or compressed, and that the expansion of said spring puts the picker in motion, whereupon the hooks 15 will remove cotton from the bolls, and the spikes 18 will remove the cotton from the hooks and cause the cotton to enter the sack. Some of the spikes 18 are arranged to work between the hooks 15 and others at opposite sides of the hooks 15. Manifestly the casings 8 are manipulated through the medium of the handles 2 thereon.

The top walls 30 of the casings 8 are hinged and detachably fastened in closed position through the medium of hooks 31 so that the interiors of the picker mechanisms may be conveniently inspected when occasion demands.

It is within the purview of my invention to construct the several parts of the apparatus of any material or materials most appropriate to the respective purposes of the parts. I would state, however, that I prefer in practice to construct the casings 8 of aluminum.

It is also within the purview of the invention to fasten the sack to the attachments 5 so the attachments will hold the adjacent sack portions open for the passage of cotton into the sack, and to utilize the bottom walls of the attachments 5 as doors.

Having described my inventiton, what I claim and desire to secure by Letters-Patent, is:—

1. A hand cotton-picking apparatus, comprising a sack, a picker casing thereon, a picker chain or belt, and spring actuating means; said means being constructed and connected to be put under tension by movement of the sack and picker casing with respect to the body of the person by whom the apparatus is carried; the apparatus being provided with a handle and with a strap to rest on the shoulder of an operator and a belt to pass around the body of the operator, and the spring means being connected through the medium of a cord with the said belt.

2. In an organized manually-operable cotton picking apparatus, cotton picking mechanisms operable by the hands of an operator and movable relatively to the operator's body at opposite sides thereof, means to connect said mechanisms with the operator's body, and means to actuate said mechanisms when the same are moved relatively to the operator's body, said last-named means including springs and connections between the springs and the operator's body.

In testimony whereof I affix my signature.

ABRAHAM T. SHIPMAN.